United States Patent [19]

Takeshita et al.

[11] 4,141,596
[45] Feb. 27, 1979

[54] HYDRAULIC BRAKE CONTROL ASSEMBLY RESPONSIVE TO VEHICULAR DECELERATION

[75] Inventors: Hiroshi Takeshita, Chiryu; Takashi Nagashima, Toyota, both of Japan

[73] Assignee: Aisin Seiki Kabushiki Kaisha, Kariya, Japan

[21] Appl. No.: 847,935

[22] Filed: Nov. 2, 1977

[30] Foreign Application Priority Data

Nov. 4, 1976 [JP] Japan .................. 51-133047

[51] Int. Cl.$^2$ ................................................ B60T 8/14
[52] U.S. Cl. .................. 303/24 C; 303/24 F
[58] Field of Search ............... 303/24 F, 24 C, 6 C

[56] References Cited

U.S. PATENT DOCUMENTS 3,944,293  3/1976  Ishigami ..................... 303/24 F Primary Examiner—Trygve M. Blix
Assistant Examiner—Reinhard J. Eisenzopf
Attorney, Agent, or Firm—Finnegan, Henderson, Farabow & Garrett

[57] ABSTRACT

An improved hydraulic brake control assembly for automotive vehicles having a proportioning valve for regulating the hydraulic pressure applied to the rear wheel brakes from a master brake cylinder in accordance with vehicular load. A control device responsive to vehicular deceleration and hydraulic pressure from the master brake cylinder controls the proportioning valve by a slidable piston of the control device applying an urging force on the proportioning valve varied in response to the hydraulic pressure applied to the slidable piston. The hydraulic pressure from the master brake cylinder applied to the slidable piston is modified by first valve, a second pressure-sensitive valve and an orifice. The first valve controls admission of the hydraulic pressure to the slidable piston in response to predetermined vehicular deceleration, the orifice and the second valve being in parallel, the hydraulic pressure normally being supplied to the slidable piston through the orifice. The normally-closed second valve is opened when a predetermined hydraulic pressure difference is reached on opposing sides of the orifice for supplying the hydraulic pressure to the slidable piston without pressure throttling by the orifice. The proportioning valve therefore operates to provide a proper hydraulic pressure to the rear wheel brakes in accordance with different vehicular loads and braking applications.

19 Claims, 8 Drawing Figures

HYDRAULIC BRAKE CONTROL ASSEMBLY RESPONSIVE TO VEHICULAR DECELERATION

BACKGROUND OF THE INVENTION

This invention relates to an improved hydraulic brake control assembly for automotive vehicles.

More particularly, this invention relates to an improved hydraulic brake control assembly for automotive vehicles that is responsive to vehicular deceleration and load.

When a driver of an automotive vehicle depresses the brake pedal, a dangerous skidding condition may occur due to the locking of the rear wheels prior to the front wheels. This locking condition generally occurs during certain braking applications and vehicular loads when the same hydraulic brake pressure is applied to both the front and rear wheel brakes from the master brake cylinder of the vehicle. Various devices have been proposed and exist that are positioned between the front or rear wheel brakes, usually the rear wheel brakes, and the master brake cylinder for changing the ratio of the hydraulic pressure on the rear wheel brakes to that of the master brake cylinder pressure.

Generally, it is well-known that vehicle deceleration is proportional to the hydraulic brake pressure and that the hydraulic brake pressure, in order to obtain a certain deceleration, is varied according to the loading conditions of the vehicle, i.e., the brake pressure necessary to obtain a certain deceleration at the minimum vehicle load is smaller than the brake pressure necessary to obtain the same deceleration at the maximum vehicle load. That is to say, as the vehicle load increases the hydraulic pressure necessary for braking must also increase.

It is known to provide a hydraulic brake control device that includes a proportioning valve for changing the hydraulic pressure ratio between the master brake cylinder and rear wheel brakes and a pressure-sensitive valve assembly for regulating and actuating the proportioning valve in accordance with vehicular deceleration.

It is also known to provide the pressure-sensitive valve assembly in such devices with an inertia-responsive member for controlling the admission of the hydraulic pressure to actuate the proportioning valve in accordance with vehicular deceleration. According to the conventional devices, however, the pressure supplied to the pressure-sensitive valve assembly can under certain circumstances be excessive prior to closure of the inertia-responsive member such as when the vehicular driver suddenly depresses the brake pedal during a low vehicular load and produces a sudden hydraulic pressure supplied to the pressure-sensitive assembly from the master cylinder. As a result of this, the large hydraulic pressure applied to the pressure-sensitive assembly causes the proportioning valve to remain unactuated or maintained in its open position and thereby causes application of a large amount of hydraulic pressure to the rear wheel brakes from the master brake cylinder. A serious and undesirable locking condition of the rear wheels can therefore occur during a small vehicular load when using these conventional brake control devices.

In order to prevent this situation, there has been developed a hydraulic brake control assembly of the type described above that uses an orifice in the pressure-sensitive valve assembly to throttle sudden hydraulic pressure from being applied, such as during low vehicular load, and thus provide a proper control of the proportioning valve. Accordingly, when there is low vehicular load and a substantial brake application occurs, the proportioning valve will not remain in its open position but will be actuated or deflected to proportion the hydraulic pressure being applied to the rear wheel brakes from the master brake cylinder to avoid a rear wheel locking condition.

Such a hydraulic brake control assembly is shown in U.S. Pat. No. 3,944,293. However, this hydraulic brake control assembly still does not completely satisfy all vehicular load and braking application conditions to provide the optimum braking force to the wheels. Under certain sudden braking application conditions, hydraulic pressure may not be sufficiently increased because of the throttling effect of the orifice. Consequently, the deflecting or actuation point of the proportioning valve may remain low before closure of the inertia-responsive valve during a large vehicular load such that a sufficient braking force on the rear wheels may not be obtained. This is caused by a premature proportioning of the hydraulic pressure to the rear wheel brakes by the proportioning valve being actuated a low level. In view of the above, it is seen that proper and optimum braking pressure applied to the rear wheel brakes under different vehicular load and braking application conditions has not as yet been achieved by these hydraulic brake control assemblies.

Accordingly, it is a primary object of this invention to provide a new and improved hydraulic brake control assembly which overcomes the aforesaid drawbacks and difficulties in providing a proper and optimum hydraulic braking pressure to the rear and front wheels.

It is a further object of this invention to provide a new and improved hydraulic brake control device which secures a proper hydralic braking pressure under all vehicular load and braking application conditions.

Another object of the invention is to provide a new and improved hydraulic brake control assembly wherein the deflecting or actuation point of the proportioning valve be properly modified in accordance with vehicular deceleration and load, and braking applications.

Still another object of this invention is to provide a new and improved hydraulic brake control assembly which provides a higher deflecting or actuation point of the proportioning valve when braking application is suddenly applied during a high vehicular load.

A further object of this invention is to provide an improved hydraulic braking control assembly which provides the above objects and a low deflecting or actuation point of the proportioning valve when braking application is suddenly applied during a low vehicular load.

Still a further object of this invention is to provide a new and improved hydraulic brake control assembly which is simple in construction and inexpensive in manufacturing cost, while providing a reliable and proper hydraulic braking pressure to the rear and front wheels.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, an improved hydraulic brake control assembly for automotive vehicles having front and rear wheel brake means and a hydraulic braking master cylinder fluidically connected to each of the front and rear brake means is provided comprising: (1) valve proportioning means interposed between the master cylinder and at least one of the wheel brake means for regulating the hydraulic pressure applied to at least one of the wheel brake means from the master cylinder in accordance with vehicular load, wherein the valve proportioning means includes a reciprocable proportioning piston subjected at a first section formed in said valve proportioning means to the hydraulic pressure in the wheel brake means and at a second section formed in the valve proportioning means to the hydraulic pressure from the master cylinder, the proportioning piston being normally urged to a position allowing hydraulic pressure communication between the first and second sections; (2) control means responsive to vehicular deceleration and hydraulic pressure from the master cylinder for controlling the valve proportioning means in accordance with vehicular load wherein the control means includes — (a) slidable piston means engaged with said reciprocable proportioning piston varied in response to hydraulic pressure applied to the piston means, the piston means normally urging the proportioning piston to an open hydraulic pressure communication position; (b) first passage means for supplying hydraulic pressure from the master cylinder to the piston means; (c) first valve means interposed in the first passage means for controlling admission of the hydraulic pressure supplied to the piston means in response to vehicular deceleration; (d) orifice means interposed in the passage means for throttling the hydraulic pressure supplied to the piston control means; and (e) second valve means positioned parallel to the orifice means in the passage means and normally closed, the second valve means being opened when a predetermined difference in hydraulic pressure is reached on opposite sides of the orifice means for supplying the hydraulic pressure to the piston means without pressure throttling by the orifice means.

It is preferred in one embodiment of the invention that the second valve means be a relief valve and wherein the orifice means and relief valve are positioned in the first passage means between the first valve means and the slidable piston means.

It is preferred in another embodiment of the invention that the second valve means be a metering valve and wherein the first valve means is positioned in the first passage means between the combination of the orifice means and metering valve, and the slidable piston means.

It is preferred in both embodiments of the invention that a third valve means be provided in the first passage means normally urged closed for preventing supply of hydraulic pressure to the slidable piston means and opened in response to a predetermined hydraulic pressure for admitting the hydraulic pressure to the slidable piston means.

It is further preferred that the at least one wheel brake means be the rear wheel brake means and that the front wheel brake means be directly connected to the hydraulic braking master cylinder.

Finally, it is preferred in both embodiments of the invention that the slidable piston means comprise a slidable piston mounted in a housing co-axially with the reciprocal proportioning piston with a spring positioned between opposing ends of the slidable piston and the proportioning piston for normally urging the proportioning piston to an open hydraulic pressure position, and wherein a first pressure control chamber is formed in the first passage means at the other end of the slidable piston for moving the slidable piston to vary the urging force of the spring exerted on the reciprocal proportioning piston in response to hydraulic pressure supplied to the first pressure control chamber.

BRIEF DESCRIPTION OF THE DRAWINGS

The accompanying drawings illustrate several embodiments of the invention and, together with the description serve to explain the principles of the invention.
Of the Drawings.

DETAILED DESCRIPTION OF THE PREFERRED EMBODIMENTS OF THE INVENTION

Reference will now be made in detail to the present preferred embodiments of the invention, examples of which are illustrated in the accompanying drawings.

Figure 1:
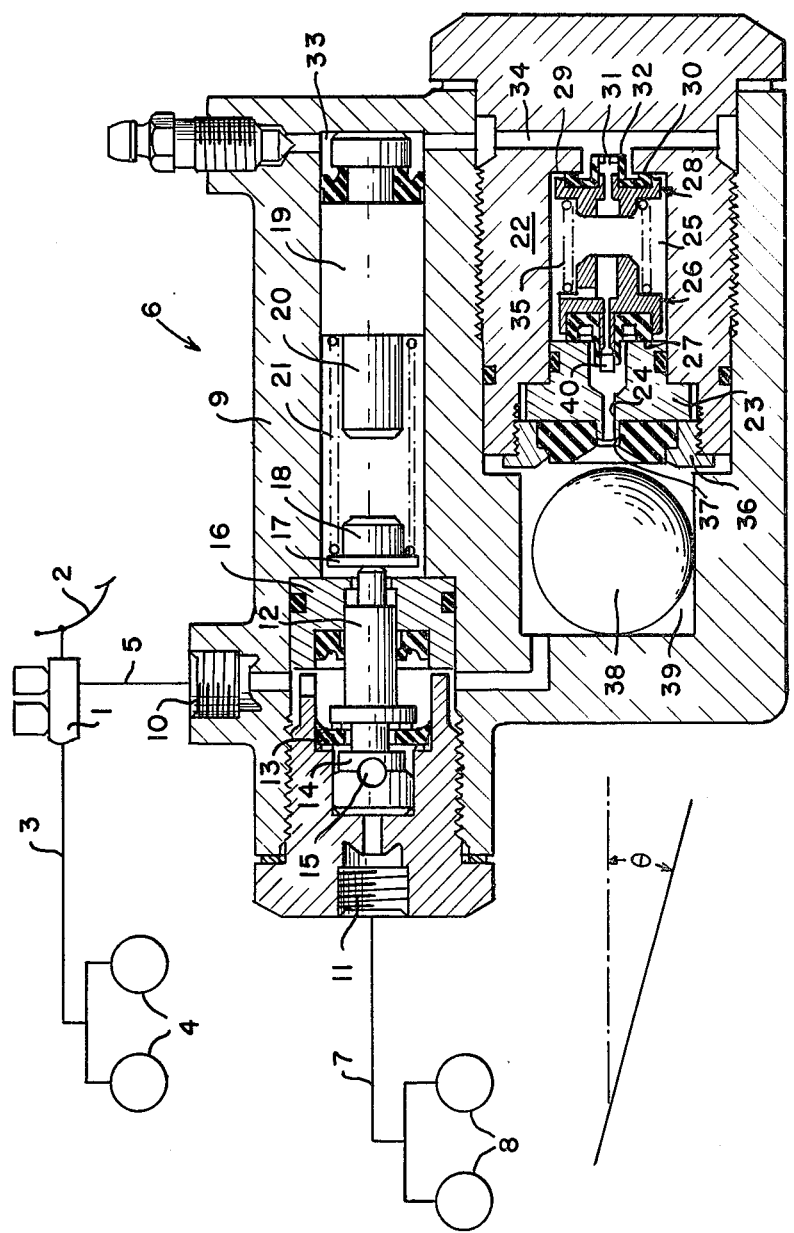
FIG. 1 is a sectional view of a first preferred embodiment of the improved hydraulic brake control assembly employing the teachings of this invention.

Referring now to the first preferred embodiment shown in FIG. 1, there is a tandem master brake cylinder 1 for generating a hydraulic braking pressure upon depression of a brake pedal 2. The master brake cylinder 1 is fluidically connected to front wheel brake means 4 via a conduit 3 and to rear wheel brake means 8 via conduits 5 and 7. Preferably, the improved hydraulic brake control assembly 6, in accordance with this invention, is interposed between conduits 5 and 7 for controlling the hydraulic pressure applied to the rear wheel brake means 8 from the master brake cylinder 1 while hydraulic pressure is applied directly to the front wheel brake means 4 from the master brake cylinder 1. As herein embodied, the conduits 5 and 7 and control assembly 6 generally provide greater retardation of hydraulic pressure to the rear wheel brake means 8 than the conduit 3 to the front wheel brake means 4.

In accordance with this invention, the improved hydraulic brake control assembly 6 comprises valve proportioning means interposed between the master cylinder 1 and the rear wheel brake means 8 for regulating the hydraulic pressure applied to the rear wheel brake means 8 from the master brake cylinder 1 in accordance with vehicular load, and control means responsive to vehicular deceleration and hydraulic pressure from the master brake cylinder 1 for controlling the valve proportioning means in accordance with vehicular load.

As herein embodied, the valve proportioning means includes a reciprocal proportioning piston 12 subjected at a first section formed in the valve proportioning means to the hydraulic pressure in the rear wheel brake means 8 and subjected at a second section formed in the valve proportioning means to the hydraulic pressure supplied from the master cylinder 1. The proportioning piston 12 is normally urged to an open position allowing hydraulic pressure communication between the first and second sections, and thus from the master brake cylinder 1 to the rear wheel brake means 8.

Preferably, a housing 9 is provided for encompassing the valve proportioning means and control means and is mounted on the vehicular body at a predetermined angular inclination designated in FIG. 1 as $\theta$. The vehicle is assumed to advance in the rightward direction of FIG. 1. Housing 9 is provided with an inlet port 10 connected to the conduit 5 and an outlet port 11 connected to the conduit 7. Passage means is formed in the housing 9 between the inlet and outlet ports 10 and 11, respectively, in which is positioned the reciprocal proportioning piston 12.

It is preferred that a resilient valve seat 13 be affixed in the passage means between ports 10 and 11 upon which a valve portion 14 of the proportioning piston 12 may be seated when the piston 12 is reciprocated rightwardly by hydraulic pressure in rear wheel brake means 8 acting thereon. The first section of the valve proportioning means is thus formed on the side of the piston 12 leftward from the valve seat 13 and is subject to the hydraulic pressure of the rear wheel brake means 8 while the second section of the valve is formed on the side of the piston 12 rightward from the valve seat 13 and is subjected to the hydraulic pressure from the master cylinder 1 through inlet port 10. A clearance is formed between the valve portion 14 of the piston 12 and the valve seat 13 in communication with a passage 15 formed in piston 12 to allow normal hydraulic pressure communication between the master cylinder 1 and rear wheel brake means 8. It is further preferred that a fixed support sleeve 16 be mounted in the housing 9 in which the proportioning piston 12 is slidable. A retainer at the righward end of the sleeve 16 has one side abutting on the right end of the piston 12 and a projection 18 formed on the other side.

In accordance with the invention, the control means for controlling the valve proportioning means includes a slidable piston means engaged with the reciprocal proportioning piston 12 for applying an urging force on the piston 12 that is varied in response to the hydraulic pressure applied to the slidable piston means. This slidable piston means normally urges the proportioning piston 12 to a position that allows hydraulic pressure flow to the rear wheel brake means 8 from the master brake cylinder 1.

As herein embodied and as best shown in FIG. 1, the slidable piston means comprises a piston 19 slidably mounted in the housing 9 coaxially with the proportioning piston 12. Preferably, the piston 19 is slidable in a chamber formed adjacent the fixed support sleeve 16. The slidable piston 19 has a projection 20 formed at its left end facing the retainer 17 and a compression spring 21 is interposed between the projection 18 of the retainer 17 and the projection 20 of the slidable piston 19 for urging the retainer 17 and the slidable piston 19 away from each other. The compression spring 21 normally urges the proportioning piston 12 leftwardly to an open hydraulic pressure communication position so that hydraulic pressure generated from the master cylinder 1 can flow through the clearance between the valve portion 14 and the valve seat 13 through the passage 15 to the rear wheel brake means 8.

In accordance with the invention, passage means is provided in the control means so that hydraulic pressure is supplied from the master cylinder 1 to the slidable piston means. As herein embodied, a pressure control chamber 33 is formed in the passage means at the right end of the slidable piston 19 to which hydraulic pressure is applied. Preferably, the passage means for supplying hydraulic pressure to the slidable piston 19 is formed in the housing 9 and is connected to the master brake cylinder 1 through the valve proportioning means via inlet port 10 which in turn is connected to the pressure control chamber 33 via the passage 34. The hydraulic pressure applied to the pressure control chamber 33 moves the slidable piston 19 to vary the urging force of the spring 21 against the proportioning piston 12 through the retainer 17. The leftward urging force against the proportioning piston 12 thus determines the activating or deflecting point of the piston 12 that initiates its proportioning operation.

In accordance with the invention, the control means of the improved hydraulic brake control assembly 6 further comprises valve means for controlling admission of the hydraulic pressure applied to the slidable piston means in response to vehicular deceleration.

As herein embodied, the valve means responsive to the vehicular deceleration is an inertia-responsive valve disposed within a chamber 39 of the passage means from the master cylinder 1 to the pressure control chamber 33. Preferably, the inertia-responsive valve comprises a seat 36 fixedly positioned at the right end of the chamber 39 with a hole 37 for admitting hydraulic pressure through the seat 36 and a ball 38 cooperative with the seat 36 for closing the hole 37 to prevent hydraulic pressure to the pressure control chamber 33 upon application of a predetermined vehicular deceleration. When the predetermined vehicular deceleration is reached, the ball 38 is rolled along the wall of the chamber 39 onto the seat 36 to interrupt hydraulic pressure communication from the master cylinder 1 to the chamber 33.

When the vehicular deceleration is below the predetermined value, the ball 38 remains in its position as illustrated in FIG. 1 to permit hydraulic pressure communication between the master cylinder 1 and the pressure control chamber 33. Preferably, the wall of the chamber 39 is not sloped and instead the hydraulic brake assembly 6 is set at the angle $\theta$ to derive the predetermined vehicular deceleration for actuating the inertia-responsive valve.

As herein embodied, a pressure control chamber 25 is formed in the passage means between the inertia-responsive valve and the pressure control chamber 33. Preferably, a plug 22 is sealingly fitted in the passage means, such as by screw threading, at the lower portion of the housing 9, the plug having a pressure control chamber 25 therein. At the left side of the plug 22 is secured a stationary member 23 limiting the chamber 25 and having therein a hole 24 in communication with the hole 37 of the inertia-responsive valve.

As herein embodied, a valve means 26 is positioned at the left end of the pressure control chamber 25 adjacent the inertia-responsive valve for controlling admission of hydraulic pressure entering the pressure control chamber 25 through holes 37 and 24. The valve means 26 is normally urged closed for preventing supply of hydraulic pressure to the pressure control chamber 25 and opened in response to a predetermined hydraulic pressure for admitting the hydraulic pressure to the pressure control chamber 25. Preferably, the valve means 26 is normally urged against a valve seat 27 formed on the stationary member 23.

In accordance with the invention, orifice means is interposed in the passage means of the control means for throttling hydraulic pressure supplied to the piston control means. Also in accordance with the invention, a normally closed valve means is positioned parallel to the orifice means in the passage means of the control means and is opened when a predetermined hydraulic pressure difference is reached on opposite sides of the orifice means for supplying the hydraulic pressure to the piston means without the throttling effect of the orifice means.

As herein embodied, the orifice means and the valve means positioned parallel thereto are incorporated into into a relief valve assembly 28. Preferably, the relief valve assembly 28 is positioned at the right end of the pressure control chamber 25 and includes a body portion having a member 30 in sealing engagement with a seat 29 defined on the right shoulder of the pressure control chamber 25. An orifice 31 is formed in the body portion of the relief valve assembly 28 for admitting hydraulic pressure to control chamber 33 via passage 34 from pressure chamber 25. The orifice 31 provides a throttling effect when sudden hydraulic pressure is applied in pressure control chamber 25 from master cylinder 1. A normally-closed relief valve portion 32 is arranged parallel to the orifice 31 on the body portion of the assembly 28 and is opened when a predetermined hydraulic pressure difference is reached on the opposite sides of the orifice 31, i.e., in chamber 25 and passage 34, for supplying hydraulic pressure to the pressure control chamber 33 without any throttling effect by the orifice 31.

As herein embodied, a spring 35 is interposed between the relief valve assembly 28 and the valve means 26 to normally urge the valve means 26 into sealing engagement with valve seat 27 while urging the member 30 of the relief valve assembly 28 into sealing engagement with seat 29. The valve means 26 is thus opened in response to an application of hydraulic pressure applied from the master cylinder 1 through the passage means via holes 37 and 24 which overcomes the urging force of the spring 35. It is preferred that a valve portion 40 be fitted on the valve means 26 for allowing return of hydraulic pressure from the pressure control chamber 33 via passage 34 through pressure control chamber 25 to the master cylinder 1 when braking application on the master cylinder 1 is released.

Further reference is now made to FIGS. 3-6, to describe in detail the operation of the improved hydraulic brake control assembly 6 as embodied and shown in FIG. 1.

In operation, when the brake pedal 2 is depressed hydraulic pressure is generated in the master cylinder 1 and is supplied to the conduits 3 and 5. The hydraulic pressure from the master cylinder 1 through the conduit 3 is transmitted directly to the front wheel brake cylinder means 4. Consequently, hydraulic pressure $P_M$ of the master braking cylinder 1 is generally the same as the hydraulic pressure $P_F$ of the front wheel brake means 4 and are hereinafter treated as such. The hydraulic pressure generated in the master cylinder 1 when the brake pedal 2 is depressed is transmitted to the rear wheel brake means 8 through the hydraulic brake control assembly 6 in accordance with this invention.

Figure 3:
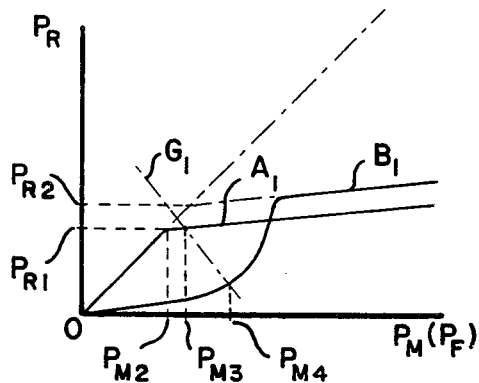
FIG. 3 is a graph showing the relationship between hydraulic pressure in the rear wheel brake means ($P_R$) and the front wheel brake means ($P_F$ or $P_M$) when there is a small vehicular load, for the embodiments of the hydraulic brake control assembly, in accordance with this invention, shown in FIGS. 1 and 2.
Figure 4:
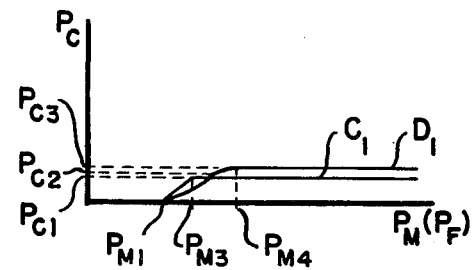
FIG. 4 is a graph showing the relationship between hydraulic pressure in the slidable piston means ($P_C$) and the front wheel brake means ($P_F$ or $P_M$) when there is a small vehicular load, for the embodiments of the hydraulic brake control assembly, in accordance with this invention, shown in FIGS. 1 and 2.

The operational results of the hydraulic brake control assembly 6 when there is a small vehicular load is best shown in FIGS. 3 and 4. When the brake pedal 2 is gradually depressed in a normal braking application to generate a corresponding gradual hydraulic pressure from the master cylinder 1, the relationship between the hydraulic pressure $P_M$ in the master cylinder 1 and the hydraulic pressure $P_R$ in the rear wheel brake means 8 is shown by the solid line $A_1$ in FIG. 3. The relationship between the hydraulic pressure $P_M$ of the master cylinder 1 and the hydraulic pressure $P_C$ in the pressure control chamber 33 during this condition is shown by the solid line $C_1$ in FIG. 4. The vehicular deceleration during this operation is shown by the solid line $G_1$ in FIG. 3.

When the hydraulic pressure is gradually increased in the master cylinder 1, this hydraulic pressure is supplied through conduit 5 and inlet 10 to the chamber 39 and through the hole 37 to hole 24. However, due to the sealing engagement of the valve means 26 against the seat 27, hydraulic pressure is not introduced to the pressure control chamber 25 and thus no pressure is received at pressure control chamber 33. At this time the slidable proportioning piston 12 is being urged by the spring 21 leftwardly to its normal open position so that the hydraulic pressure from the master cylinder 1 is also introduced to the rear wheel brake means 8.

When the hydraulic pressure $P_M$ of the master cylinder 1 increases to a predetermined level $P_{M1}$, the valve means 26 is opened against the urging force of the spring 35 so that hydraulic pressure is admitted through hole 24 to the pressure control chamber 25 and through orifice 31 and passage 34 to pressure control chamber 33. When the hydraulic pressure $P_R$ in the rear wheel brake means 8 increases to a level $P_{R1}$, the proportioning piston 12 is moved rightwardly against the urging force of the spring 21 to initiate its proportioning operation and thereby interrupting the hydraulic pressure from the master cylinder 1 to rear wheel brake means 8. As previously stated, the actuating point of the proportioning piston 12, i.e., the deflecting point, is determined by the urging force of the spring 21 on the piston 12 which is varied by movement of the slidable piston 19 in response to hydraulic pressure $P_C$ applied in the pressure control chamber 33. The slidable piston 19 is initiated to move leftwardly to increase the urging force of the spring 21 on the proportioning piston 12 only when hydraulic pressure $P_C$ in the control chamber 33 reaches a level $P_{C2}$.

When the hydraulic pressure $P_M$ of the master cylinder 1 reaches a level $P_{M3}$, the predetermined deceleration value for the inertia-responsive valve is reached so that the ball 38 is moved against the seat 36 to cut off hydraulic pressure to the pressure control chamber 33 from the master cylinder 1. As shown in FIG. 3, the inertia-responsive valve is activated to cut off hydraulic communication to the control chamber 33 where the solid lines $A_1$ and $G_1$ intersect in the graph. Because of the cutting-off of the hydraulic pressure to the control chamber 33 at this time, the hydraulic pressure $P_C$ in the control chamber 33 is maintained at a level $P_{C1}$. Because of this, the slidable piston 19 has not reached the pressure level $P_{C2}$ and thus is not moved and is maintained in its position illustrated in FIG. 1 to allow the proportioning operation of the piston 12.

Again referring to FIGS. 3 and 4, when there is a small vehicular load and the brake pedal 2 is suddenly depressed, a sudden hydraulic pressure increase is generated from the master cylinder 1. During this condition, the relationship between the hydraulic pressure $P_M$ of the master cylinder 1 and the hydraulic pressure $P_R$ of the rear wheel brake means 8 is shown by the solid line $B_1$ in FIG. 3. The relationship between the hydraulic pressure $P_C$ in the control chamber 33 and the hydraulic pressure $P_M$ of the master cylinder 1 is indicated by the solid line $D_1$ in FIG. 4.

When the hydraulic pressure is suddenly increased in the master cylinder, the pressure is again applied against valve means 26. When the hydraulic pressure level $P_{M1}$ is reached, the valve means 26 is opened and the hydraulic pressure is admitted to the control chamber 25 from the master cylinder 1. However, the hydraulic pressure $P_C$ applied to the slidable piston 19 at control chamber 33 is less than the hydraulic pressure $P_M$ being supplied from the master cylinder during a sudden braking application due to the throttling effect of the orifice 31.

The hydraulic pressure increase $P_R$ in the rear wheel brake means 8 is also less than the hydraulic pressure increase $P_M$ in the front wheel brake means 4 because of the retardation effect of the conduits 5 and 7 as previously described. Consequently, the inertia-responsive valve reaches its predetermined vehicular deceleration value when the hydraulic pressure $P_M$ is at a level $P_{M4}$ higher than the level $P_{M3}$ needed during a normal braking application as shown in FIG. 3 at the intersection of lines $A_1$ and $G_1$. The ball 38 of the inertia-responsive valve is therefore seated against seat 36 to cut off hydraulic pressure to the control chamber 33 from the master cylinder 1 now at the intersection of the lines $G_1$ and $B_1$ in FIG. 3. When the ball 38 cuts off hydraulic pressure at a pressure level of $P_{M4}$, the hydraulic pressure $P_C$ in the control chamber 33 is at a level $P_{C3}$. This pressure level of $P_{C3}$ is higher than the previous level of $P_{C1}$ reached during a normal braking application when the inertia-responsive valve was actuated so that the slidable piston 19 is moved leftwardly to increase the urging force of the spring 21 against the piston 12. Consequently, the deflecting or actuating point of the proportioning piston 12 is at a hydraulic pressure level of $P_{R2}$ in the rear wheel brake means 8, a deflecting point that is higher than the deflecting point of $P_{R1}$ during a normal braking application.

Figure 5:
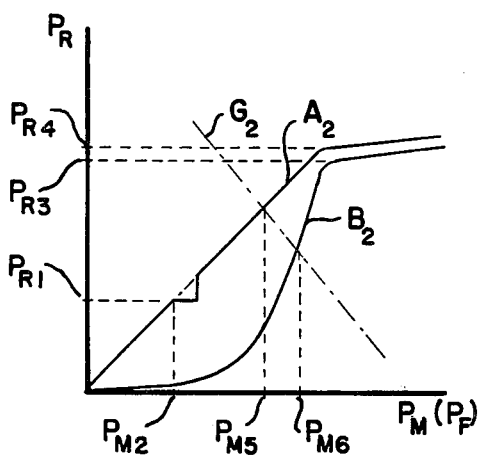
FIG. 5 is a graph showing the relationship between hydraulic pressure in the rear wheel brake means ($P_R$) and the front wheel brake means ($P_F$ or $P_M$) where there is a large vehicular load, for the embodiment of the hydraulic brake control assembly, in accordance with this invention shown in FIG. 1.
Figure 6:
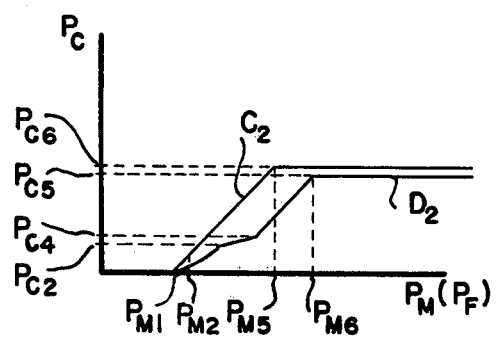
FIG. 6 is a graph showing the relationship between hydraulic pressure in the slidable piston means ($P_C$) and the front wheel brake means ($P_F$ or $P_M$) where there is a large vehicular load, for the embodiment of the hydraulic brake control assembly, in accordance with this invention, shown in FIG. 1.

Reference is now made to FIGS. 5 and 6 to show the operation for the embodiment of the hydraulic brake control assembly 6 of FIG. 1 when there is a large vehicular load. When the brake pedal 2 is gradually depressed during a normal braking application under heavy load, the relationship between the hydraulic pressure $P_R$ in the rear wheel brake means 8 and the hydraulic pressure $P_M$ of the master cylinder 1 is shown by the solid line $A_2$ in FIG. 5. The relationship between the hydraulic pressure $P_M$ of the master cylinder 1 and the hydraulic pressure $P_C$ in the control chamber 33 is shown by the solid line $C_2$ in FIG. 6. The vehicular deceleration during a gradual depression of the brake pedal 2 is shown by the line $G_2$ in FIG. 5.

Again, when the hydraulic pressure $P_M$ reaches the predetermined level of $P_{M1}$, the valve means 26 is opened to provide hydraulic pressure to the control chamber 33 from the master cylinder 1. Because the hydraulic pressure $P_C$ in the control chamber 33 is below the level of $P_{C2}$ when the hydraulic pressure $P_R$ of the rear wheel brake means 8 reaches the level $P_{R1}$, the slidable piston 19 is not moved and remains in position as illustrated in FIG. 1. Consequently, the proportioning valve piston 12 moves rightwardly to start its proportioning of the hydraulic pressure from the master cylinder 1 to the rear wheel brake means 8. Since there is a large vehicular load, the predetermined deceleration value of the inertia-responsive valve is reached when the hydraulic pressure $P_M$ of the master cylinder 1 reaches a level $P_{M5}$ rather than at the level $P_{M2}$, which was the deceleration valve during a normal braking application when there was a small vehicular load.

Prior to reaching the hydraulic pressure level $P_{M5}$, the hydraulic pressure $P_C$ in the control chamber 33 increases at the same ratio as the hydraulic pressure $P_M$ from the master cylinder 1 since the orifice 31 would have no throttling effect during a gradual increase in the hydraulic pressure $P_M$ generated by the master cylinder 1. When the pressure $P_C$ in the control chamber 33 reaches a level $P_{C2}$ before the level $P_{M5}$ is reached, the slidable piston 19 is moved leftwardly to increase the exerting force of the spring 22 on the proportioning piston 12. Consequently, the proportioning operation of the proportioning piston 12 is released. Piston 12 is returned to its open position so that the hydraulic pressure $P_R$ in the rear wheel brake means 8 is immediately increased up to the hydraulic pressure $P_M$ of the master cylinder 1. Thereafter, the hydraulic pressure $P_R$ is increased at the same ratio as the master cylinder pressure $P_M$ until a pressure level $P_{M5}$ is reached.

When the master cylinder pressure $P_M$ reaches the $P_{M5}$ level, the ball 38, as previously stated, is seated on a seat 36 to interrupt the hydraulic pressure communication from the master cylinder 1 to the pressure control chamber 33. By doing so, the hydraulic pressure $P_C$ in the control chamber 33 is maintained at a level $P_{C6}$. Because the hydraulic pressure $P_C$ is maintained at a level $P_{C6}$, the hydraulic pressure $P_R$ increases in relationship to the hydraulic pressure $P_M$ for a time. When the hydraulic pressure $P_R$ reaches a level $P_{R4}$ that is sufficient to overcome the urging force of the spring 21, increased by the hydraulic pressure $P_{C6}$ maintained in the control chamber 33, the proportioning piston 12 is moved rightwardly to again effect its proportioning operation on the hydraulic pressure being supplied from the master cylinder 1 to the rear brake wheel means 8.

During a large vehicular load when the brake pedal 2 is suddenly depressed, a sudden hydraulic pressure is generated from the master cylinder 1. When this occurs, the relationship between the hydraulic pressure $P_M$ in the master cylinder 1 and the hydraulic pressure $P_R$ in the rear wheel brake means 8 is shown by the solid line $B_2$ in FIG. 5. The relationship between the hydraulic pressure $P_M$ of the master cylinder 1 and the hydraulic pressure $P_C$ in the control chamber 33 is shown by the solid line $D_2$ in FIG. 6.

Again, because of the retardation of hydraulic pressure being supplied from the master cylinder 1 to the rear wheel brake means relative to that supplied to the front wheel brake means 4 during a sudden braking application, the predetermined deceleration value for the inertia-responsive valve is reached at a hydraulic pressure level of $P_{M6}$. This level $P_{M6}$ is higher than the level of $P_{M5}$ required to actuate the inertia-responsive valve during a gradual depression of the brake pedal for a large vehicular load.

Prior to actuation of the inertia-responsive valve, however, the hydraulic pressure $P_C$ in the control chamber 33 is increased at a lower ratio than the hydraulic pressure $P_M$ due to the throttling effect of the orifice 31 during a sudden braking application. This of course occurs after valve means 26 is opened at hydraulic pressure level $P_{M1}$. When a difference in the hydraulic pressure between the opposite sides of the orifice 31 reaches a predetermined level $P_{C4}$, the relief valve portion 32 of the relief valve assembly 28 is opened to permit hydraulic pressure to the control chamber 33 without the throttling effect of the orifice 31. By doing so, the urging force of the spring 21 is increased against the proportioning piston 12 to maintain that piston 12 in an open position. This operation ensures that sufficient hydraulic pressure is applied to the rear wheel brake means 8 from the master cylinder 1 that is needed during a high vehicular load. Without this increased hydraulic pressure $P_C$ in the control chamber 33, piston 12 would move rightwardly prematurely shutting off hydraulic fluid communication between the master cylinder 1 and the rear wheel brake means 8 during a high vehicular load.

When the hydraulic pressure $P_M$ reaches the level $P_{M6}$ the ball, as previously stated, shuts off pressure communication from the control chamber 33 and the pressure $P_C$ in the control chamber 33 is maintained at a level $P_{C5}$. Because the hydraulic pressure $P_C$ in the control chamber 33 is kept at a level $P_{C5}$ close to the $P_{C6}$ level maintained during normal braking application under heavy load, the deflecting or actuating point of the proportioning valve 12 is maintained at an hydraulic pressure level of $P_{R3}$ for the rear wheel brake means 8 that is close to the level $P_{R4}$ in the rear wheel brake means 8 during normal braking application under heavy load.

When the brake pedal 2 is released during any of the above conditions, the hydraulic pressure in the pressure control chamber 33 is released by being returned to the master cylinder 1 through the orifice 31, or by moving the relief valve assembly 28 leftwardly, and through the valve portion 40 of the valve means 26.

Figure 2:
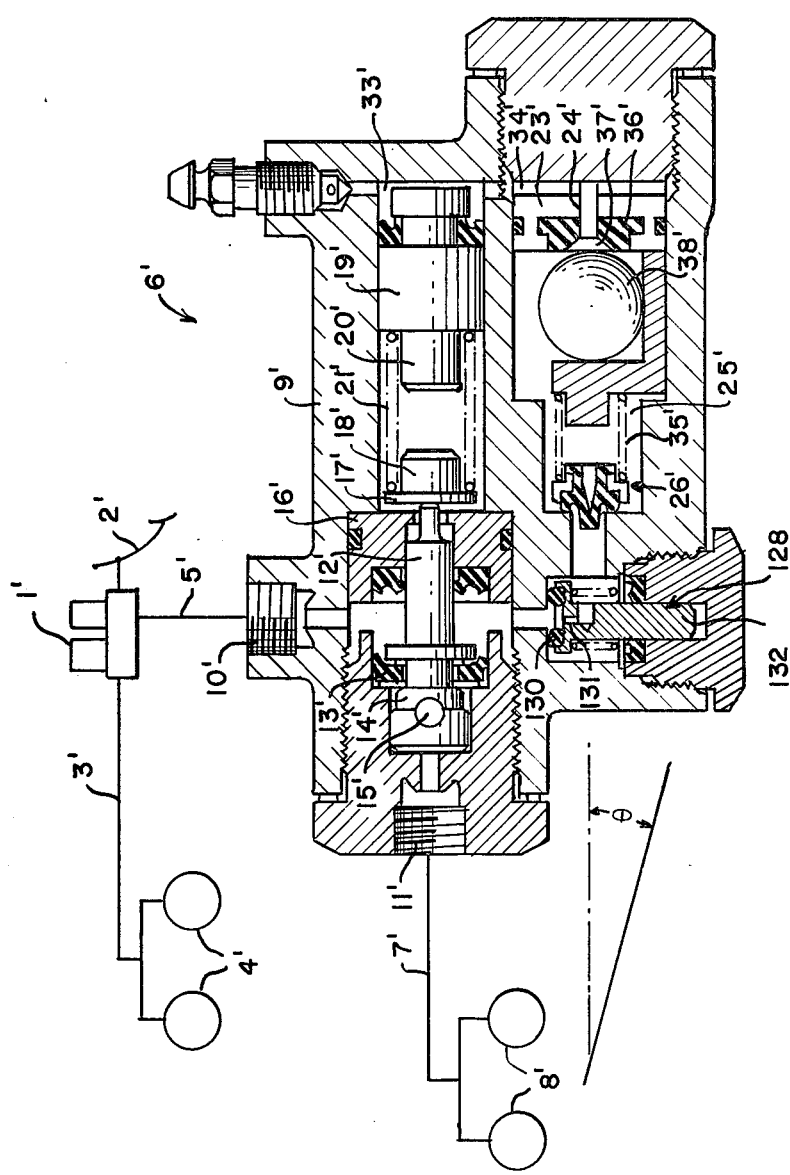
FIG. 2 is a sectional view of a second preferred embodiment of the improved hydraulic brake control assembly employing the teachings of this invention.

Referring now to FIG. 2, a second preferred embodiment of the improved hydraulic brake control assembly is shown wherein the same elements as in the previous embodiment are indicated by the same reference numerals with the affix (').

As herein embodied, the orifice means and the valve means positioned parallel to the orifice means are incorporated into a metering valve assembly 128 positioned in the passage means of the control means before the valve means 26' and the inertia-responsive valve with ball 38' and seat 36'. The metering valve assembly 128 includes a fixed assembly body with a metering piston 132 slidably positioned therein. The metering piston 132 is normally urged in sealing engagement with the passage means of the control means by a sealing portion 130. An orifice 131 is formed in the slidable metering piston 132 for throttling sudden hydraulic pressure applied from the master cylinder 1' to pressure control chamber 33', via the valve means 26', pressure chamber 25', the through-holes 37' and 24', and passage 34'. The metering piston 132 is moved to an open position when a predetermined hydraulic pressure difference is reached on the opposite sides of the orifice 131 in the passage means. When opened, hydraulic pressure is supplied to the pressure control chamber 33' without the throttling effect of the orifice.

Preferably, the metering valve assembly 128 is positioned before the pressure control chamber 25' with the ball 38' and seat 36' of the inertia-responsive valve positioned at the right end of the pressure control chamber 25'. The valve 26' is again positioned at the left side of the pressure control chamber 25'. A spring 35' urges the valve 26' to a normally closed position against the shoulder of the pressure control chamber 25'. Since the other elements of the second embodiment shown in FIG. 2 are substantially the same as the embodiment shown in FIG. 1, further detailed explanation thereof may be omitted.

The operational results of the embodiment shown in FIG. 2 during normal and sudden braking applications when there is a small vehicular load are substantially the same as the operational results of the embodiment shown in FIG. 1 as set forth in FIGS. 3–4. Similarly, the operational results of the embodiment shown in FIG. 2 are substantially the same as that for the embodiment of FIG. 1 during a normal braking application when there is a large vehicular load.

Figure 7:
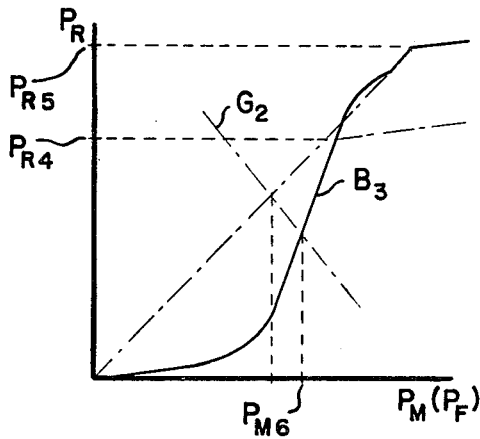
FIG. 7 is a graph showing the relationship between hydraulic pressure in the rear wheel brake means ($P_R$) and the front wheel brake means ($P_F$ or $P_M$) where there is a large vehicular load, for the embodiment of the hydraulic brake control assembly, in accordance with this invention, shown in FIG. 2.
Figure 8:
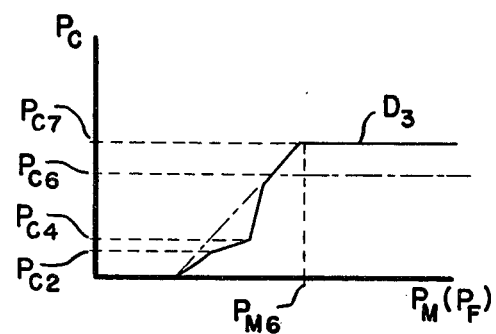
FIG. 8 is a graph showing the relationship between the hydraulic pressure in the slidable piston means ($P_C$) and the front wheel brake means ($P_F$ or $P_M$) when there is a large vehicular load, for the embodiment of the hydraulic brake control assembly, in accordance with the invention, shown in FIG. 2.

Reference is now made to FIGS. 7–8 to describe in detail the operation of the second embodiment during a sudden braking application when there is a large vehicular load. The relationship between the hydraulic pressure $P_M$ from the master cylinder 1 and the hydraulic pressure $P_R$ in the rear wheel brake means 8' during a sudden braking application is shown by the solid line $B_3$ in FIG. 7. The relationship between the hydraulic pressure $P_M$ of the master cylinder 1' and the hydraulic pressure $P_C$ in the pressure control chamber 33' during a sudden braking application is shown by the solid line $D_3$ in FIG. 8.

Similar to the first embodiment of FIG. 1, the ball 38' of the inertia-responsive valve is moved to cut off hydraulic pressure communication to the control chamber 33 during a large vehicular load at a pressure level $P_{M6}$. When the inertia-responsive valve is actuated, the hydraulic pressure $P_C$ in the control chamber 33' is maintained at a level $P_{C7}$. However, prior to actuation of the inertia-responsive valve, the orifice 131 throttles the hydraulic pressure being applied to the control chamber 33' so that the hydraulic pressure $P_C$ increases at a lesser rate to the hydraulic pressure $P_M$. When the hydraulic pressure difference on the opposite sides of the orifice 131 reaches a predetermined level $P_{C4}$, metering piston 132 is moved downwardly to open, and to provide hydraulic pressure to the control chamber 33' immediately without the throttling effect of the orifice 131. This operation by metering piston 132 raises the pressure $P_C$ to the level of the hydraulic pressure $P_M$ and increases the urging force of the spring 21' against the slidable proportioning piston 12'. The slidable piston 12' is therefore maintained in an open position to provide a sufficient braking pressure to the rear wheel brake means 8 from the master brake cylinder 1 under heavy load during sudden braking application.

When the hydraulic pressure $P_M$ of the master cylinder 1 reaches a level $P_{M6}$, the inertia-responsive valve is closed to cut off hydraulic pressure communication to the pressure control chamber 33'. The hydraulic pressure $P_C$ at this time is maintained at a level $P_{C7}$. The level of $P_{C7}$ is higher than the $P_{C6}$ level which was maintained when the inertia-responsive valve was actuated during a normal braking application under a large vehicular load. Consequently, the deflecting or actuating point of the proportioning piston 12 is at a level $P_{R5}$ higher than the level $P_{R4}$ that was the deflecting or actuating point of the proportioning piston 12' during a normal braking application under a large vehicular load.

It will be apparent to those skilled in the art that various modifications and variations could be made in the hydraulic brake control assembly as described without departing from the spirit or scope of the invention.

What is claimed is:

1. An improved hydraulic brake control assembly for automotive vehicles having front and rear wheel brake means and a hydraulic braking master cylinder fluidically connected to each of said brake means comprising:
   a. valve proportioning means interposed between said master cylinder and at least one of said wheel brake means for regulating the hydraulic pressure applied to said at least one of said wheel brake means from said master cylinder in accordance with vehicular load, wherein said valve proportioning means includes a reciprocable proportioning piston subjected at a first section formed in said valve proportioning means to the hydraulic pressure in said at least one of said wheel brake means and at a second section formed in said valve proportioning means to the hydraulic pressure from said master cylinder, said proportioning piston being normally urged to a position allowing hydraulic pressure communication between said first and second sections;
   b. control means responsive to vehicular deceleration and hydraulic pressure from said master cylinder for controlling said valve proportioning means in accordance with vehicular load wherein said control means includes
      (i) slidable piston means engaged with said reciprocable proportioning piston for applying an urging force on said proportioning piston varied in response to hydraulic pressure applied to said piston means, said piston means normally urging said proportioning piston to an open hydraulic pressure communication position;
      (ii) first passage means for supplying hydraulic pressure from said master cylinder to said piston means;
      (iii) first valve means interposed in said first passage means for controlling admission of the hydraulic pressure supplied to said piston means in response to vehicular deceleration;
      (iv) orifice means interposed in said first passage means for throttling the hydraulic pressure supplied to said piston means; and
      (v) second valve means positioned parallel to said orifice means in said first passage means and normally closed, said second valve means having a valve portion being opened when a predetermined difference in hydraulic pressure is reached on opposite sides of said orifice means for supplying the hydraulic pressure to said piston means without pressure throttling by said orifice means.

2. An improved hydraulic brake control assembly as set forth in claim 1 wherein said second valve means is a relief valve, and wherein said orifice means and relief valve are positioned in said first passage means between said first valve means and said slidable piston means.

3. An improved hydraulic brake control assembly as set forth in claim 2 wherein said control means further comprises third valve means positioned in said first passage means between said first valve means and said orifice means and said relief valve, said third valve means normally urged closed for preventing supply of hydraulic pressure to said orifice and relief valve and opened in response to a predetermined hydraulic pressure for admitting the hydraulic pressure to said orifice and relief valve.

4. An improved hydraulic brake control assembly as set forth in claim 1 wherein said second valve means is a metering valve, and wherein said first valve means is positioned in said first passage means between said parallel orifice means and metering valve and said slidable piston means.

5. An improved hydraulic brake control assembly as set forth in claim 4 wherein said control means further comprises third valve means positioned in said first passage means between said orifice means and metering valve and said first valve means, said third valve means normally urged closed for preventing supply of hydraulic pressure to said first valve means and opened in response to a predetermined hydraulic pressure for admitting the hydraulic pressure to said first valve means.

6. An improved hydraulic brake control assembly as set forth in claim 1 wherein said at least one wheel brake means is said rear brake means and wherein said front wheel brake means is directly connected to said master cylinder.

7. An improved hydraulic brake control assembly as set forth in claim 6 further comprising conduits for connecting said master cylinder to each of said front and rear wheel brake means, said conduit to said rear wheel brake means providing greater hydraulic retardation than said conduit to said front wheel brake means.

8. An improved hydraulic brake control assembly as set forth in claim 1 further comprising a housing for said valve proportioning means and control means having an inlet connected to said master cylinder, an outlet connected to said at least one wheel brake means, and a second passage means formed between said inlet and outlet in which is positioned said reciprocable proportioning piston, and wherein said first passage means is formed in said housing connected at one end to said second passage means at said second section and at the other end to said slidable piston means.

9. An improved hydraulic brake control assembly as set forth in claim 8 wherein said slidable piston means comprises a slidable piston mounted in said housing coaxially with said reciprocable proportioning piston and a spring positioned between one end of said slidable piston and opposing end of said reciprocable proportioning piston for normally urging said proportioning piston to an open position and wherein a first pressure control chamber is formed in said first passage means at the other end of said slidable piston for moving said slidable piston to vary the urging force of said spring exerted on said reciprocable proportioning piston in response to hydraulic pressure supplied to said first pressure control chamber.

10. An improved hydraulic brake control assembly as set forth in claim 9 wherein said first valve means is an inertia-responsive valve cooperative with said first passage means and being normally open, said inertia-responsive valve closing said first passage means to hydraulic pressure upon application of a predetermined vehicular deceleration in accordance with vehicular load, and wherein said orifice means and second valve means are incorporated in a relief valve assembly positioned between said inertia-responsive valve and said first pressure control chamber with a body portion in sealing engagement with said first passage means, an orifice formed in said body portion for throttling hydraulic pressure supplied therethrough to said first pressure control chamber, and a normally closed relief valve portion arranged in parallel to said orifice, said relief valve portion being opened when a predetermined difference in hydraulic pressure is reached on opposite sides of said orifice in said first passage means for supplying hydraulic pressure therethrough to said first pressure control chamber without the throttling effect of said orifice.

11. An improved hydraulic brake control assembly as set forth in claim 10 wherein said first passage means includes a second pressure control chamber formed therein between said inertia-responsive valve and first pressure control chamber, and wherein a third valve means is positioned at one end of said second pressure control chamber for controlling admission of hydraulic pressure to said second pressure control chamber from said inertia-responsive valve, said third valve means being normally urged closed to prevent supply of hydraulic pressure to said second pressure control chamber and opened in response to a predetermined hydraulic pressure for admitting hydraulic pressure to said second pressure control chamber, and wherein said relief valve assembly is positioned at the other end of said second pressure control chamber with one side of said orifice being subjected to hydraulic pressure in said second pressure control chamber and the other side of said orifice being subjected to hydraulic pressure in said first pressure control chamber.

12. An improved hydraulic brake control assembly as set forth in claim 11 wherein said inertia-responsive valve comprises a seat positioned in said first passage means with a through-hole formed therein for admitting hydraulic pressure to said third valve means and a ball cooperative with said seat for closing said through-hole to prevent hydraulic pressure to said third valve means upon application of the predetermined vehicular deceleration.

13. An improved hydraulic brake control assembly as set forth in claim 11 wherein shoulders are formed at the ends of said second pressure control chamber and wherein a spring is interposed between said third valve means and said relief valve assembly for urging said third valve means to a normally closed position against one shoulder, and said relief valve assembly to a sealing position against the other shoulder, and wherein said third valve means is opened in response to the application of a hydraulic pressure which overcomes the urging force of said spring.

14. An improved hydraulic brake control assembly as set forth in claim 13 wherein said third valve means includes a valve portion for allowing return of hydraulic pressure from said first pressure control chamber to said master cylinder through said first passage means when braking application on said master cylinder is released.

15. An improved hydraulic brake control assembly as set forth in claim 9 wherein said first valve means is an inertia-responsive valve cooperative with said first passage means and being normally open, said inertia-responsive valve closing said first passage means to hydraulic pressure upon application of a predetermined vehicular deceleration in accordance with vehicular load, and wherein said orifice means and second valve means are incorporated in a metering valve assembly positioned in said first passage means before said inertia-responsive valve with a fixed assembly body, a metering piston slidably positioned in said body and normally urged in sealing engagement with said first passage means, and an orifice formed in said slidable metering piston for throttling hydraulic pressure supplied therethrough to said inertia-responsive valve, and wherein said metering piston is moved to an open position when a predetermined difference in hydraulic pressure is reached on opposite sides of said orifice in said first passage means for supplying hydraulic pressure therethrough to said inertia-responsive valve without the throttling effect of said orifice.

16. An improved hydraulic brake control assembly as set forth in claim 15 wherein said first passage means includes a second pressure control chamber formed therein between said metering valve assembly and first pressure control chamber, and wherein a third valve means is positioned at one end of said second pressure control chamber for controlling admission of hydraulic pressure to said second pressure control chamber from said metering valve assembly, said third valve means being normally urged closed to prevent supply of hydraulic pressure to said second pressure control chamber and opened in response to a predetermined hydraulic pressure for admitting hydraulic pressure to said second control chamber, and wherein said inertia-responsive valve is positioned at the other end of said control chamber with one side being subjected to hydraulic pressure in said second pressure control chamber and the other side being subjected to hydraulic pressure in said first pressure control chamber.

17. An improved hydraulic brake control assembly as set forth in claim 15 wherein shoulders are formed at the ends of said second pressure control chamber and wherein said inertia-responsive valve comprises a seat positioned against one shoulder of said second pressure control chamber with a through-hole formed therein for admitting hydraulic pressure to said first pressure control chamber and a ball cooperative with said seat for closing said through-hole to prevent hydraulic pressure to said first pressure control chamber upon application of the predetermined vehicular decleration.

18. An improved hydraulic brake control assembly as set forth in claim 17 wherein a spring is positioned for urging said third valve means to a normally closed position against the shoulder formed at the other end of said second pressure control chamber and wherein said third valve means is opened in response to the application of a hydraulic pressure which overcomes the urging force of said spring.

19. An improved hydraulic brake control assembly as set forth in claim 18 wherein said third valve means includes a valve portion for allowing return of hydraulic pressure from said first pressure control chamber to said master cylinder through said first passage means when braking application on said master cylinder is released.

* * * * *